(12) United States Patent
Sato et al.

(10) Patent No.: US 7,862,433 B2
(45) Date of Patent: Jan. 4, 2011

(54) COMMUNICATION GAME PROGRAM AND COMMUNICATION GAME SYSTEM

(75) Inventors: Katsuhisa Sato, Kyoto (JP); Yusuke Shiraiwa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 426 days.

(21) Appl. No.: 11/441,086

(22) Filed: May 26, 2006

(65) Prior Publication Data

US 2007/0078003 A1    Apr. 5, 2007

(30) Foreign Application Priority Data

Oct. 4, 2005    (JP) .............................. 2005-291637

(51) Int. Cl.
*A63F 9/24* (2006.01)
*A63F 13/00* (2006.01)
*G06F 17/00* (2006.01)
*G06F 19/00* (2006.01)

(52) U.S. Cl. .............................. 463/42; 463/30; 463/40
(58) Field of Classification Search .................. 463/39, 463/40, 41, 42
See application file for complete search history.

(56) References Cited

U.S. PATENT DOCUMENTS

| | | | | | |
|---|---|---|---|---|---|
| 4,570,930 | A | * | 2/1986 | Matheson ..................... | 463/41 |
| 5,618,045 | A | * | 4/1997 | Kagan et al. ................... | 463/40 |
| 6,042,477 | A | * | 3/2000 | Addink ......................... | 463/42 |
| 2002/0194269 | A1 | * | 12/2002 | Owada et al. ............... | 709/203 |

FOREIGN PATENT DOCUMENTS

| | | |
|---|---|---|
| EP | 1 158 741 | 11/2001 |
| JP | 7-213744 | 8/1995 |
| JP | 2004-105671 | 4/2004 |
| JP | 2005-137405 | 6/2005 |
| JP | 2006-320502 | 11/2006 |
| WO | 98/14886 | 4/1998 |

OTHER PUBLICATIONS

GameSutra, "Dead Reckoning: Latency Hiding for Networked Games," Sep. 19, 1997, http://www.gamasutra.com/view/feature/3230/dead_reckoning_latency_hiding_for_.php.*
Fujimoto, "7.4 Distributed Interactive Simulation, Parallel and Distributed Simulation Systems", John Wiley & Sons, Jan. 2000, pp. 199-209.
Brockwington, "Client-Side Movement Prediction, Massively Multiplayer Game Development", Charles River Media, Feb. 2003, pp. 293-313.
Bernier, "Latency Compensating Methods in Client/Server In-game Protocol Design and Optimization", Proc. Game Developers Conference (Online), Mar. 20, 2001-Mar. 24, 2001, 13 pages, www.gamasutra.com/features/gdcarchive/2001/bernier.doc.

* cited by examiner

*Primary Examiner*—Pierre Eddy Elisca
*Assistant Examiner*—Reginald A Renwick
(74) *Attorney, Agent, or Firm*—Nixon & Vanderhye P.C.

(57) ABSTRACT

A game device receives from another game device through a network calculation data. The calculation data includes, at least, position data which represents a position of an object operated by using the other game device, and time data which represents time in which the object is at the position. The game device calculates, based on the position data and the time data included in the received calculation data, a calculated position of the object as of when the calculation data is received. Further, the game device determines, based on the calculated position, a position of the object in a game space as of when the calculation data is received.

8 Claims, 13 Drawing Sheets

COMMUNICATION GAME PROGRAM AND COMMUNICATION GAME SYSTEM

CROSS REFERENCE TO RELATED APPLICATION

The disclosure of Japanese Patent Application No. 2005-291637 is incorporated herein by reference.

BACKGROUND

1. Field of the Technology

The technology presented herein relates to a communication game program and a communication game system. More particularly, the technology relates to a communication game program and a communication game system for executing a game in which a plurality of objects are respectively operated by a plurality of game devices.

2. Description of the Background Art

Conventionally, a game system in which a plurality of players participate in a same game simultaneously by connecting a plurality of game devices to each other through a network is widely known. Particularly, in recent years, a network role playing game (hereinafter, referred to as a network RPG) has become popular. A plurality of players are able to participate in the network RPG through a server, or through a peer to peer network.

In such network game as described above, when a player participating in the network game operates a game object by using his/her game device, the game device operated by the player transmits to other participating game devices data concerning the object operated by the game device of the player. The data concerning the object is, for example, position data which represents a position of the object inside a game space. The other participating game devices determine for each game device positions and actions of all objects which are in the same game space based on the data concerning the object. However, a delay in communication occurs frequently among the game devices in the game system in which the game devices are connected to each other through the network. That is, due to the delay in communication among the game devices connected through the network, there can be a situation in which an object, for which position data is transmitted from a transmitter to receivers, is already at a different position compared with where the object is according to the position data (i.e., position information is already out-dated by the time the information is received).

In the network RPG, no substantial harm is caused thereupon as long as all the participating game devices arrive at the same end result of the game in spite of slight difference in images displayed on each game device at a given point in the course of the game. That is, there is no major problem for the network RPG, even if all the participating game devices are not synchronized in terms of data reception due to increase and decrease of a network traffic (whether the network is connected in a wireless manner or wired manner), or noise in the data reception.

On the other hand, when executing games such as a racing game or an action game in a communication system through the network, an accurate display of a progress of such game cannot be achieved simply by relying on data transmitted by participating game devices. For example, consider a case of a racing game in which data transmitted by a game device is position data indicating a position of a racecar at a given time. In this case, by the time the position data, transmitted by the game device operating a racecar, is received by a reception game device, the racecar will probably not be at a position represented by the position data. Therefore, indicating the racecar at the position as represented by the position data does not represent actual progress of the racing game. When playing games such as the racecar game or the action game, a player needs to operate the game with an accurate timing and with swiftness. To this end, if displays indicating progress of the game are not synchronized for all the participating game devices, each game device participating in the game processes the game differently from one another, which means that a result of the game is invalid.

In patent document 1 (Japanese Laid-Open Patent Publication No. 2004-105671), there is a disclosure of a game system which is directed to solving the aforementioned problem by using a client-server type network. According to the game system, a client calculates a position of where a racecar operated thereby is going to be in a predetermined period of time. Then the client transmits to the server information concerning a current position of the racecar, information concerning time (future time) after the predetermined period of time has passed, and information concerning the calculated position of where the racecar is going to be in the predetermined period of time. Further, the client receives from the server information transmitted to the server from other clients. Then, the client calculates, based on the aforementioned information concerning calculated positions of the racecar and the future time, current positions of other racecars operated by other clients. As described above, by calculating positions of where the racecars are going to be in the future, this game system attempts to solve the problem concerning the delay of the communication.

According to the game system disclosed in the patent document 1, the game device at a receiving end receives data, which is transmitted by other game devices at transmitting ends and concerns calculated position and future time, and specifies positions of where other racecars operated by other game devices at the transmitting ends of the data are going to be. However, it is a difficult task to accurately detect an actual amount of time required for the game device to receive the data transmitted by other game devices. For example, even if the amount of time required for the data transmission is measured in advance, a network connection environment (e.g., communication speed or noise) changes constantly, and therefore, in actuality, data is not always guaranteed to be received by the receiving end as measured. Furthermore, when data is transmitted from one of the transmitting ends to the receiving end, there is a case where the data is received after a future time represented by the data has passed. When such case happens, the game device at the receiving end becomes unable to specify positions of the racecars. Therefore, according to the conventional game system, since calculations are executed by the game device at the transmitting end, by the time the game device at the transmitting end transmits a result of the calculation the result is already out-dated, and by the time the receiving end receives the result, the result may have no validity at all. Therefore, in order to prevent such problem from happening, a future time could be set as far apart as possible from a current time. This, however, reduces an accuracy of the calculation and thereby conflicting with an accurate calculation.

SUMMARY

Therefore, a feature of an example embodiment presented herein is to provide a communication game system and a communication game program for calculating as accurately as possible a position of an object which is operated by a third party game device participating in a same game.

The example embodiment has applied thereon the following configuration in order to solve the problem as described above. Note that reference numerals and supplementary explanations are shown in parentheses below for assisting the reader in finding corresponding components in the description of a preferred embodiment below to facilitate the understanding of the example embodiment. It is understood that these parenthetic expressions are in no way intended to restrict the scope of the example embodiment.

A first aspect is a computer readable storage medium having stored therein a communication game program (game program 51) executed in a computer (CPU core 21, etc) of a game device (10) included in a communication game system in which a plurality of game devices (game devices 10a through 10c) are connected to each other through a network (1), the communication game program causing the computer to execute: a reception step (S7); a calculated position calculation step (S43, S44); and a position determination step (S45). The reception step is a step of receiving from another game device calculation data including, at least, position data (64a) representing a position of an object (carts 41 through 43), in a game space, operated by the other game device, and time data (64c) representing time at which the object is at the position. The calculated position calculation step is a step of calculating, based on the position data and the time data included in the calculation data received in the reception step, a calculated position (position Qn+3 shown in FIG. 7) of the object as of a point in time in a predetermined period of time, the point in time in the predetermined period of time is determined when the calculation data is received. The position determination step is a step of determining, based on the calculated position, a position (position Rn+3 shown in FIG. 7), in the game space, of the object as of when the calculation data is received in the reception step.

In a second aspect, the calculated position calculation step is executed when the calculation data is received in the reception step. Then, the position determination step is repeatedly executed per predetermined period of time (per frame of time). In the position determination step, a position (position Rn+3) of the object is determined based on a latest calculated position (position Qn+3 shown in FIG. 7) calculated in the calculated position calculation step, and the position (position Rn+2 shown in FIG. 7) determined in the previously executed position determination step.

In a third aspect, in the position determination step, a position between the previous position of the object and the calculated position is determined to be the position of the object as of when the calculation data is received in the reception step.

In a fourth aspect, in the position determination step, the calculated position is determined to be the position of the object as of when the calculation data is received in the reception step.

In a fifth aspect, in the calculated position calculation step, a time lag ($\Delta t$), between time represented in the time data included in the calculation data received in the reception step and time in which the calculation data is received, is calculated, and the calculated position of the object as of when the calculation data is received is calculated based on the time lag.

In a sixth aspect, the calculation data further includes change of degree data (speed data 64b) representing a change of degree for the object with respect to positions as of when the object is at the position as represented by the position data, which is included in the calculation data; in the calculated position calculation step, the calculated position of the object as of the point in time in the predetermined period of time is calculated based on the position data, the time data and the change of degree data included in the calculation data.

In a seventh aspect, the calculation data further includes operation data (64d) which represents a game operation executed as of when the object is at the position as indicated by the position data, which is included in the calculation data; and in the calculated position calculation step, the calculated position of the object as of the point in time in the predetermined period of time is calculated based on the position data, the time data and the operation data included in the calculation data.

In an eight aspect, the calculation data further includes inclination data which represents an inclination of the object as of when the object is at the position as indicated by the position data, which is included in the calculation data; and in the reception step, the computer is further caused to execute, based on the inclination data included in the calculation data received in the reception step, an inclination calculation step of calculating the inclination of the object as of the point in time in the predetermined period of time.

In a ninth aspect, the communication game program, further causes the computer to execute an event start step of starting a predetermined event (a racing game) simultaneously among each game device included in the game system; and the time data represents an elapsed time since when the predetermined event starts.

A tenth aspect is a communication game system in which a first game device and a second game device are connected to each other through a network (1), wherein the first game device (second game device 10b shown in FIG. 5) comprises transmission means (CPU core 21, data transmission program 53) with which the first game device transmits to the second game device (first game device 10a shown in FIG. 5) calculation data which includes, at least, position data representing a position, in a game space, of an object operated by the first game device, and time data representing time in which the object is at the position. The second game device comprises reception means (CPU core 21), calculated position calculating means (CPU core 21, calculated position calculation program 55), position determining means (CPU core 21, position determination program 56): the reception means of receiving the calculation data transmitted thereto from the first game device; the calculated position calculating means of calculating, based on the position data and the time data included in the calculation data received by the reception means, a calculated position of the object as of a point in time in a predetermined period of time, the point in time in the predetermined period of time is determined when the calculation data is received; and the position determining means of determining based on the calculated position a position of the object in the game space as of when the calculation data is received by the reception means.

According to the first aspect, the calculation data is transmitted by the game device (other game devices) at the transmitting end, the calculated position calculation step is executed by the game device at the receiving end, and thus the game device at the receiving end calculates the calculated position of cart operated by the game device at the transmitting end. In a case in which the calculated position is calculated by the game device at the transmitting end, there is a possibility that a result of the calculation is already outdated by the time the result is received by the game device at the receiving end, and thus, the received result of the calculation is unusable. According to the first aspect, however, the calculation is executed by the game device at the receiving end, and thus, the calculated position is calculated accurately and the possibility of the result of the calculation being unusable is prevented.

According to the second aspect, the position of the object is determined based on the calculated position and the position of the object from a previous frame of time. That is, the calculated position is not determined as the new position of the object. When the calculated position is determined as the new position of the object, the position of the object is updated only when the calculation data is transmitted. Since the object is displayed such that the object moves only when the calculation data is transmitted—not per predetermined period of time, if the calculation data is not transmitted, the object will not appear to be moving smoothly and thus will appear in an unnatural manner. To this end, according to the second aspect, the position of the object is updated per predetermined period of time regardless of whether or not the calculation data is received per predetermined period of time, and thus, the object is displayed naturally.

According to the third aspect, the new position of the object is to be at a position between the calculated position and the position of the object from the previous frame of time, and thus, even if the calculated position is dramatically different from that in the previous frame of time, the difference can be alleviated and the object will be displayed naturally.

According to the fourth aspect, since the new position of object is easily calculated based solely on the calculated position, processes involved in determining the position of the object are simplified, and thus a process load imposed on the computer of the game device is reduced.

According to the fifth aspect, a time lag between time represented by the time data included in the calculation data and time the calculation data is received is calculated. Then, the calculated position is calculated based on the time lag. By this, since the calculated position is to be calculated with a delay time (e.g., a delay time in communication) taken into account, it becomes possible to calculate the calculated position accurately. Note that, the aforementioned time lag is, in actuality, the delay time in communication; the calculated position calculated by using the time lag as the delay time is more accurate than the calculated position calculated by using a delay time that is measured in advance.

According to the sixth aspect since the calculated position of the object is calculated by using the velocity data thereof, the calculated position is calculated accurately.

According to the seventh aspect, since a game operation executed so as to operate the object is taken into account when calculating the calculated position, the calculated position is calculated accurately.

According to the eighth aspect, since the position of the object is calculated and an inclination of the object is also calculated, the displayed inclination of the object closely resembles the actual inclination of the object.

According to the ninth aspect, since an elapsed time having a start time, which is essentially the same for all game devices participating in a same game, is displayed in all the game devices, the calculation process for calculating calculated position based on the time data is executed accurately.

These and other features, aspects and advantages of the example embodiment presented herein will become more apparent from the following detailed description of the present invention when taken in conjunction with the accompanying drawings.

BRIEF DESCRIPTION OF THE PREFERRED EMBODIMENTS

DESCRIPTION OF THE PREFERRED EMBODIMENTS

Figure 1:
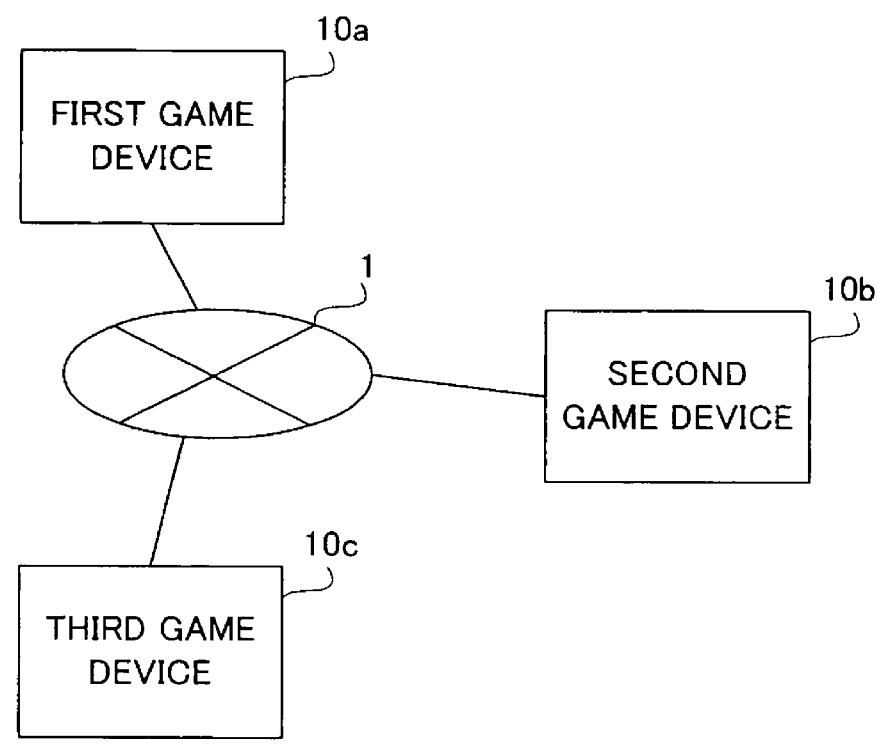
FIG. 1 is a block diagram showing a configuration of a game system according to the present embodiment.

Hereinafter, a configuration of a game device included in a game system according to an embodiment will be described with reference to the drawings. FIG. 1 is a block diagram showing a configuration of the game system according to the present embodiment. As shown in FIG. 1, the present game system has a configuration in which a plurality of hand-held game devices 10a through 10c are connected to each other through a network 1 such as the Internet (hereinafter, the hand-held game device will be referred to as a "game device"). According to the present embodiment, the game system comprises, for example, three game devices 10a through 10c each operated by a player. The game devices 10a through 10c each can be connected to the network 1 in a wireless manner; however, the game devices 10a through 10c each can also be connected in a wired manner. Further, each game device can be either hand-held or stationary. Hereinafter, the game devices 10a through 10c will be referred to as a first game device 10a, a second game device 10b, and a third game device 10c, respectively. Note that when there is no need to specify any particular game device over other game devices, any of the first through third game devices, 10a through 10c, will be simply referred to as a game device 10.

Figure 2:
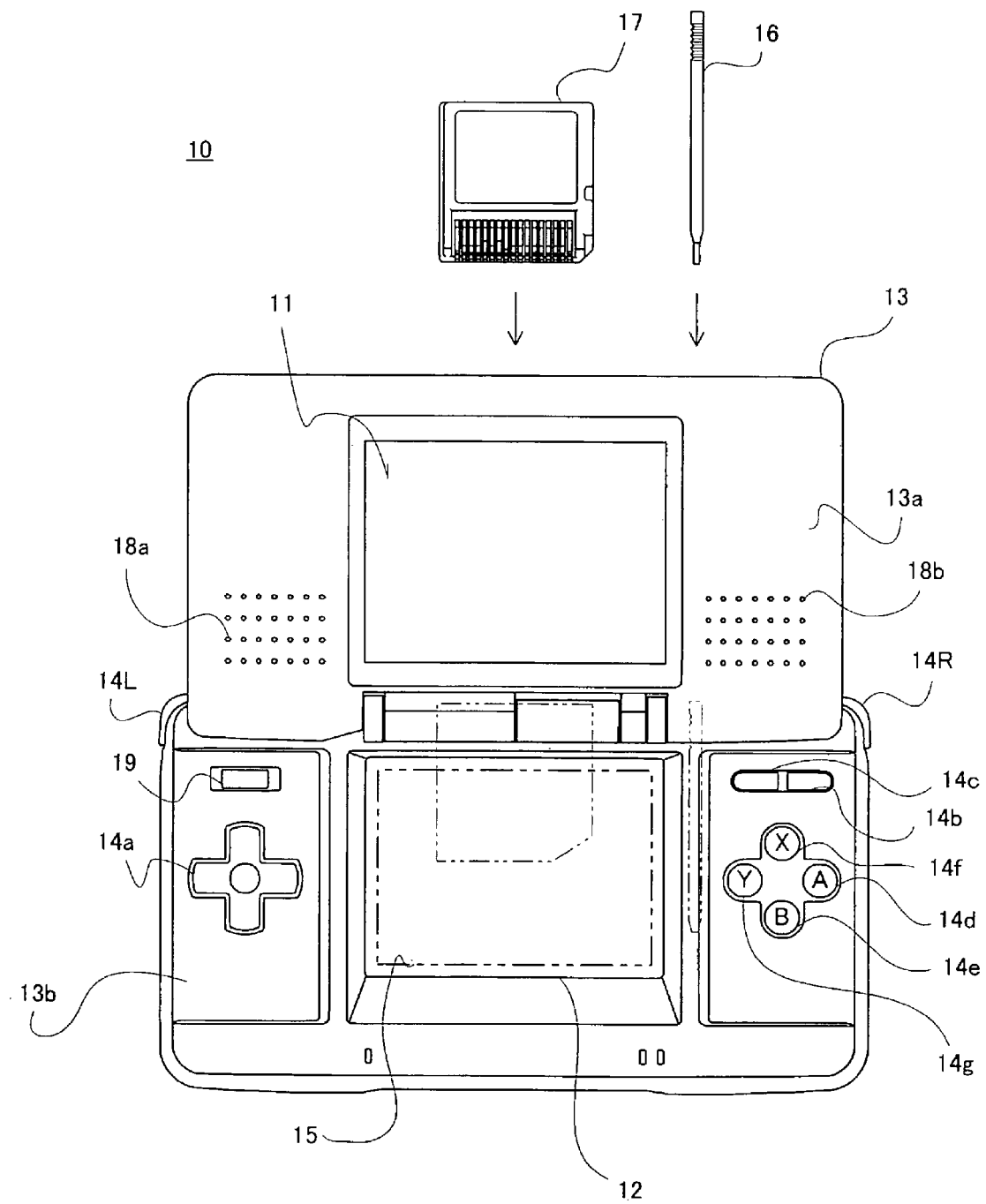
FIG. 2 is a diagram showing an external view of a game device included in the game system according to the present embodiment.

First, a configuration of a game device will be described. FIG. 2 is a diagram for showing an external view of the game device included in the game system. According to the present embodiment, the game devices 10*a* through 10*c* each have a same configuration with one another. The configuration is shown in FIG. 1.

Hereinafter, the configuration and motions of the game device will be described. FIG. 2 is a diagram showing the external view of the game device included in the game system according to the present embodiment. In FIG. 2, a game device 10 includes a first LCD (Liquid Crystal Display) 11 and a second LCD 12. A housing 13 comprises an upper housing 13*a* and a lower housing 13*b*, and the first LCD 11 is stored in the upper housing 13*a*, and the second LCD 12 is stored in the lower housing 13*b*. Resolutions of the first LCD 11 and the second LCD 12 are both 256 dots×192 dots. Note that though a LCD is used as a display device in the present embodiment, any other display devices such as a display device using an EL (Electro Luminescence) may be used. Also, the resolution of the display device may be at any level.

The upper housing 13*a* is provided with sound holes 18*a* and 18*b* for releasing a sound from a pair of loudspeakers (30*a* and 30*b* shown in FIG. 3) to an exterior. A description of the pair of loudspeakers will be provided later.

The lower housing 13*b* is provided with input devices as follows; a cross switch 14*a*, a start switch 14*b*, a select switch 14*c*, a "A" button 14*d*, a "B" button 14*e*, a "X" button 14*f*, a "Y" button 14*g*, a "L" button 14L, and a "R" button 14R. In addition, a touch panel 15 is provided on a screen of the second LCD 12 as another input device. The lower housing 13*b* further includes a power switch 19, and insertion openings for storing a memory card 17 and a stick 16.

The touch panel 15 may be of any type such as a resistive film type, an optical type (infrared type), or a capacitive coupling type. The touch panel 15 has a function of outputting, when its surface is touched with the stick 16, coordinates data which corresponds to a touch position. Though the following description is provided on an assumption that the player uses a stick 16 to operate the touch panel 15, of course the touch panel 15 may also be operated by a pen (stylus pen) or a finger instead of the stick 16. In the present embodiment, a touch panel 15 having a resolution at 256 dots×192 dots (detection accuracy) as same as the second LCD 12 is used. However, resolutions of the touch panel 15 and the second LCD 12 may not necessarily be consistent with each other.

The memory card 17 is a storage medium having a game program stored therein, and placed in the insertion slot provided at the lower housing 13*b* in a removable manner.

Figure 3:
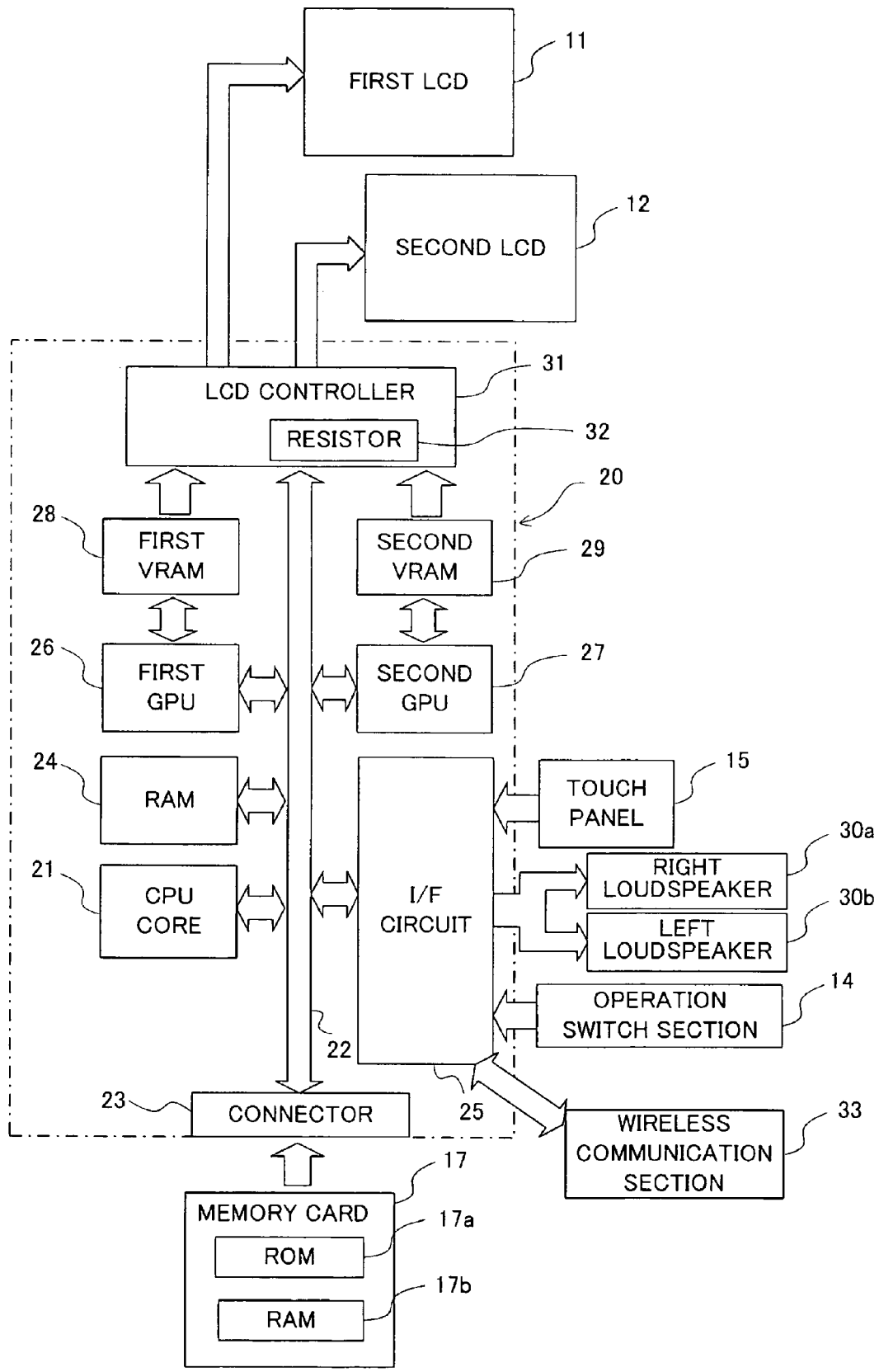
FIG. 3 is a diagram showing an internal configuration of the game device.

Next, an internal configuration of the game device 10 will be described by referring to FIG. 3. In FIG. 3, a CPU core 21 is mounted on an electronic circuit board 20 which is to be housed in the housing 13. Via a bus 22, the CPU core 21 is connected to a connector 23, an input/output interface circuit (shown as I/F circuit in the diagram) 25, a first GPU (Graphics Processing Unit) 26, a second GPU 27, a RAM 24, and a LCD controller 31. The memory card 17 is connected to the connector 23 in a removable manner. The memory card 17 includes a ROM 17*a* for storing a game program and a RAM 17*b* for storing backup data in a rewritable manner. The game program stored in the ROM 17*a* of the memory card 17 is loaded to the RAM 24, and the game program having been loaded to the RAM 24 is executed by the CPU core 21. The RAM 24 stores, in addition to the game program, data such as temporary data which is obtained by the CPU core 21 executing the game program, and data for generating a game image. To the I/F circuit 25 are connected, a touch panel 15, a right loudspeaker 30*a*, a left loudspeaker 30*b*, a wireless communication section 33 and an operation switch section 14, which is comprised of a cross switch 14*a*, a "A" button 14*d*, and others, as shown in FIG. 2. The right loudspeaker 30*a* and the left loudspeaker 30*b* are arranged inside the sound holes 18*a* and 18*b*, respectively.

A first VRAM (Video RAM) 28 is connected to the first GPU 26, and a second VRAM 29 is connected to the second GPU 27. In accordance with an instruction from the CPU core 21, the first GPU 26 generates a first game image based on data used for image generation which is stored in the RAM 24, and writes images into the first VRAM 28. The second GPU 27 also follows an instruction from the CPU core 21 to generate a second game image, and writes images into the second VRAM 29. The first VRAM 28 and the second VRAM 29 are connected to the LCD controller 31.

The LCD controller 31 includes a resistor 32. The resistor 32 stores a value of either 0 or 1 in accordance with an instruction from the CPU core 21. When the value of the resistor 32 is 0, the LCD controller 31 outputs to the first LCD 11 the first game image which has been written into the first VRAM 28, and outputs to the second LCD 12 the second game image which has been written into the second VRAM 29. When the value of the resistor 32 is 1, the first game image which has been written into the first VRAM 28 is outputted to the LCD 12, and the second game image which has been written into the second VRAM 29 is outputted to the first LCD 11.

The wireless communication section 33 is connected to the I/F circuit 25. The wireless communication section 33 has a function of transmitting to and receiving from a wireless communication section 33 of another game device data used for game processes and other type of data. The wireless communication section 33 provides, for example, a wireless communication function following IEEE802.11 wireless LAN standard protocol. The wireless communication section 33 outputs to the CPU core 21 data which is received by the wireless communication section 33. Further, the wireless communication section 33 transmits to another game device data as instructed by the CPU core 21. The game device 10 becomes able to connect via the wireless communication section 33 to the network such as the Internet by implementing on the wireless communication section 33 or a storage section inside the game device 10 a protocol such as TCP/IP (Transmission Control Protocol/Internet Protocol) or a predetermined browser. Then, the game device 10 communicates with other game devices through the network and thereby becoming able to jointly execute a same game with the plurality of other game devices. Further, the game device 10 is able to display, by using the first LCD 11 and the second LCD 12, data for documents and images that are publicly released over the network, or, by using game data that is publicly released over the network, execute game processes.

Note that the above configuration of the game device 10 is illustrative only. The example embodiment presented herein may be applied to any computer system which is operable to communicate with other devices via the network. In addition, the game program of the example embodiment which is provided to a computer system through an external storage medium such as the memory card 17, may also be provided through a wired or a wireless communication line, or may be stored in advance in a nonvolatile storage device provided in the computer system.

Figure 4:
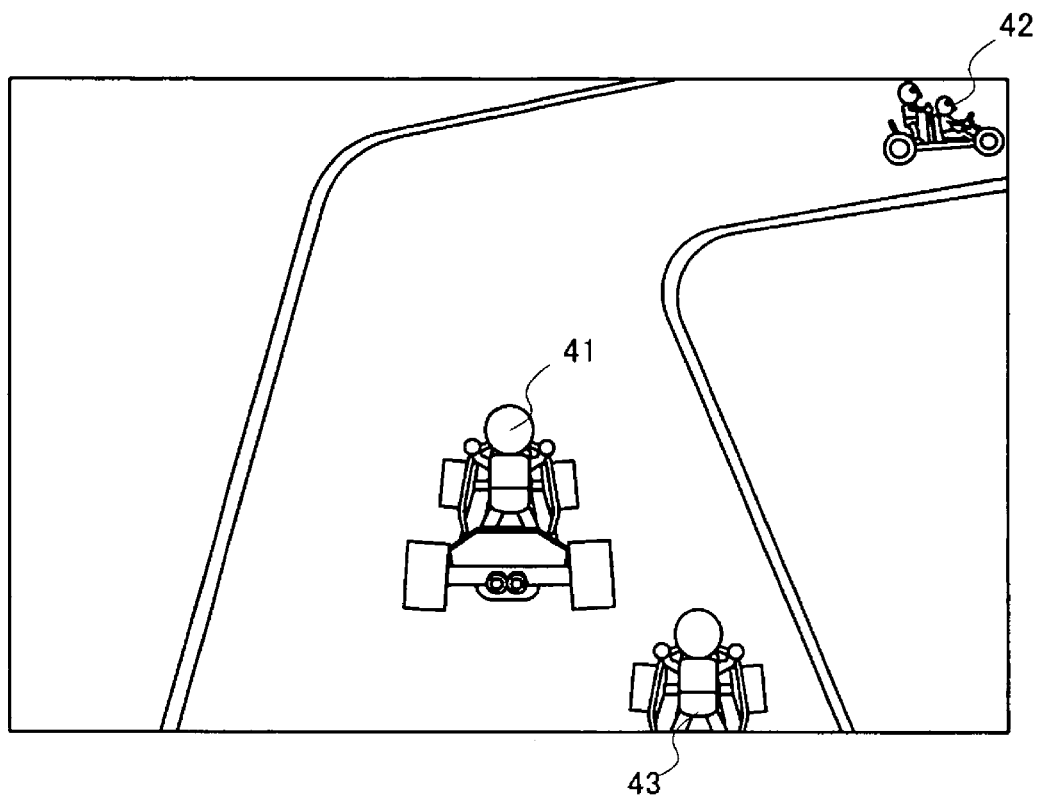
FIG. 4 is a diagram showing a game display of a game according to the present embodiment.

Hereinafter, a game, which, according to the present embodiment, is to be executed by using the game device 10 will be described. FIG. 4 is a diagram showing a game display of the game according to the present embodiment. On a screen of the second LCD 12 of the present game device 10, a cart (racecar) 41 which is an object operated by a player operating the present game device, carts 42 and 43 operated by respective players operating respective game devices are displayed. The present game is a racing game in which each participating player operates his/her game object (e.g., a race-car) and races with each other. Hereinafter, the cart 41 which is operated by using the first game device 10*a* will be referred to as a "first cart", the cart 42 which is operated by using the second game device 10*b* will be referred to as a "second cart", and the cart 43 which is operated by using the third game device 10*c* will be referred to as a "third cart". Note that, what is meant by the cart operated by using the game device is the cart whose motions are controlled in response to operations executed on the operation switch section 14, which is provided in the game device.

In the racing game such as one shown in FIG. 4, due to a nature of the game in which carts are competing with each other to finish the race as quickly as possible, it is vital that a current position of each cart respectively operated by the game devices 10*a* through 10*c* is displayed with the utmost accuracy. The game devices 10 each are, needless to say, able to accurately calculate a current position of the cart (own cart) operated respectively thereby. However, due to delays in communication caused among the game devices 10, obtaining, in realtime, data representing current positions of carts other than the own cart is difficult. Therefore, it is essential for the game devices 10 to accurately calculate current positions of carts operated by other game devices. Hereinafter, a calculation process for calculating current positions of carts operated by other participating game devices will be chiefly described.

First, a concept for the calculation process executed by the game system according to the present embodiment will be described with reference to FIGS. 5 through 8. In FIGS. 5 through 8, an exemplary situation in which the first game device 10*a* calculates a position of the (second) cart operated by using the second game device 10*b* will be described. Note that the calculation processes executed when the first game device 10*a* calculates a position of the third cart, or when the second game device 10*b* and the third game device 10*c* each calculate positions of carts operated by other participating game devices are same as those shown in FIGS. 5 through 8.

Figure 5:
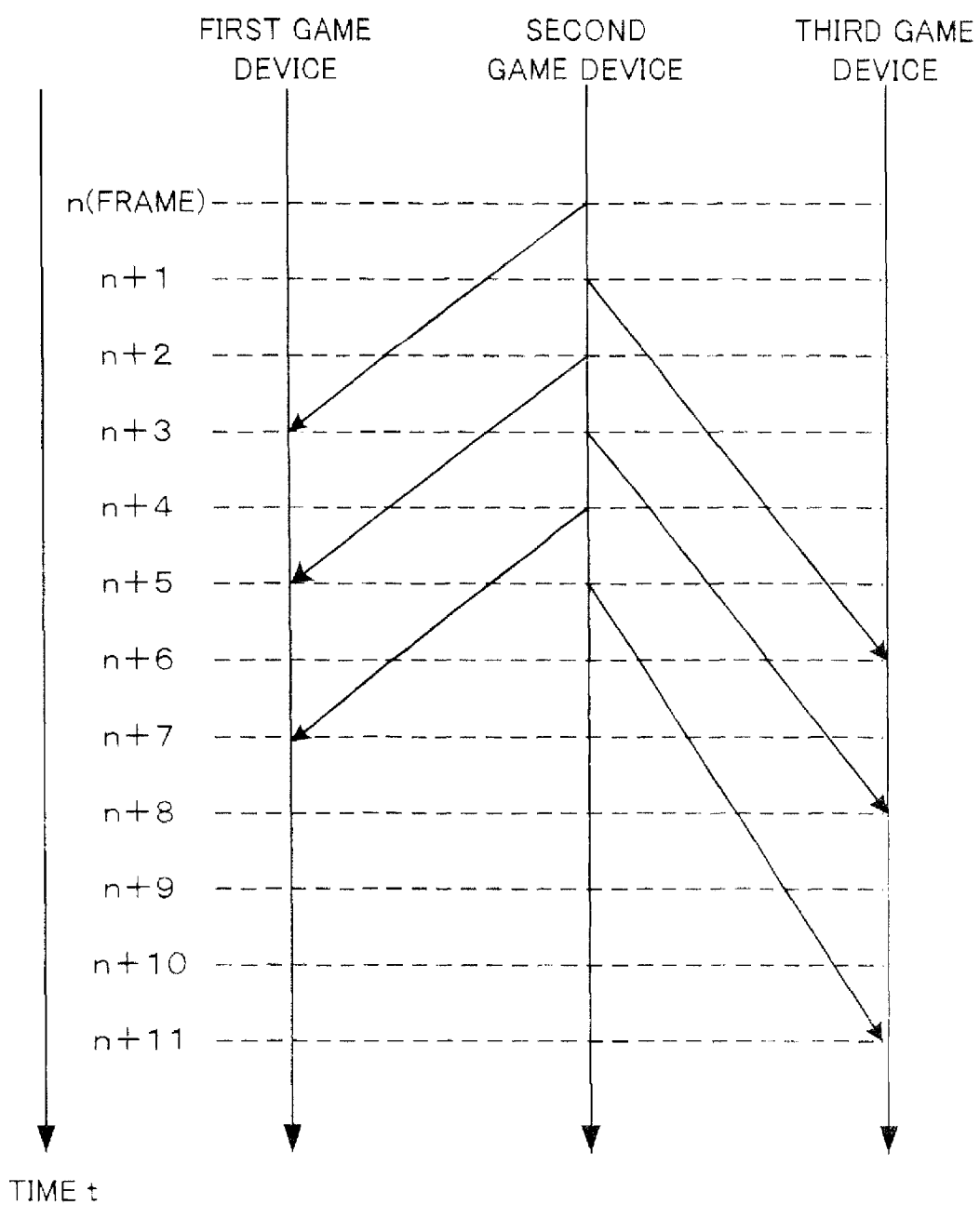
FIG. 5 is a diagram showing a transmission process in which a second game device 10b transmits calculation data to another game device.

Now, a transmission method of data used for the calculation process (hereinafter, referred to as calculation data) will be described. Here, what is meant by the calculation data is data used by a game device at a receiving end of communication for calculating a position of a cart operated by using another game device at a transmitting end of the communication. Detailed contents concerning the calculation data will be described later. FIG. 5 is a diagram showing a transmission process in which the second game device 10*b* transmits the calculation data to another game device. Note that in FIG. 5, a situation in which the second game device 10*b* transmitting the calculation data to the game devices 10*a* and 10*c* is shown; however, situations in which the game devices 10*a* and 10*c* respectively transmitting the calculation data to other respective game devices are not shown.

Note that, according to the present embodiment, the game devices 10*a* through 10*c* each measure an elapsed time since a race starts, and indicate the elapsed time of the race as a game time. Also, the elapsed time of the game is measured by frame of time (1/60 second) as a unit of time. That is, the game devices 10*a* through 10*c* each store therein a timer which counts time in a cycle of 1/60 second, and uses a counted value to measure the elapsed time of the race. FIG. 5 shows timings at which the calculation data is transmitted by the second game device 10*b* and is received by a respective communication counterpart between frames of time n and n+5 (where n is any natural number).

As shown in FIG. 5, the second game device 10*b* transmits the calculation data per frame of time. The second game device 10*b* transmits the calculation data to the first game device 10*a* at times t=n, n+2 and n+4, and transmits the calculation data to the third game device 10*c* at times t=n+1, n+3 and n+5. As described above, the second game device 10*b* transmits the calculation data to, in an order, one game device after another game device per frame of time. Note that in another embodiment, a game device can be set such that the game device transmits to all other game devices participating in the same race the calculation data per frame of time.

In FIG. 5, the calculation data transmitted by the second game device 10*b* at time t=n is, after 3 frames of time (that is, t=n+3), received by the first game device 10*a*. The calculation data includes data, which represents a status (e.g., position, velocity, etc.) of the second cart, time as of when the data is transmitted, or the like. That is, when the first game device 10*a* receives the calculation data at time t=n+3, the first game device 10*a* is informed of the status of the second cart as of 3 frames of time earlier (that is, t=n). The first game device 10*a* calculates, by using the received calculation data, the position of the second cart as of time t=n+3. Procedures executed by the first game device 10*a* to calculate the position of the second cart will be described later with reference to FIG. 7.

The calculation data transmitted by the second game device 10*b* at time t=n+2 is, after 4 frames of time (that is, t=n+6), received by the first game device 10*a*. The calculation data transmitted by the second game device 10*b* at time t=n+4 is, after 3 frames of time (that is, t=n+7), received by the first game device 10*a*. As can be understood from the description above, time it takes for the calculation data to be received by the game device at the receiving end after the calculation data being transmitted by the game device at the transmitting end is not necessarily fixed. Further, the calculation data transmitted by the second game device 10*b* at time t=n+1 is, after 5 frames of time (that is, t=n+6) received by the third game device 10*c*. As described above, time it takes for the calculation data to be received by the game device at the receiving end after the data being transmitted changes depending on game devices involved in the transmission and reception, and is not necessarily fixed.

Figure 6:
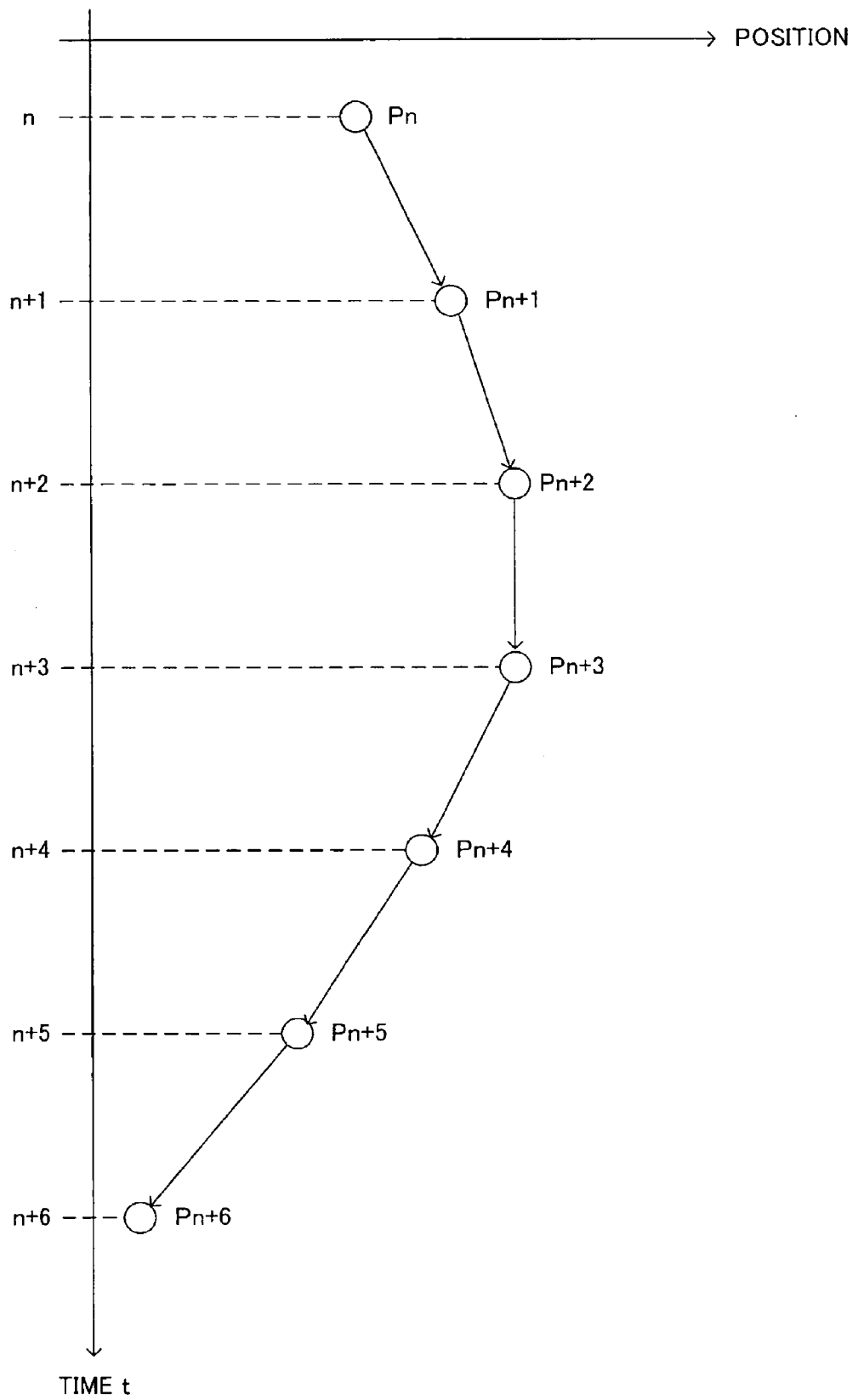
FIG. 6 is a diagram showing actual movements of a second cart.
Figure 7:
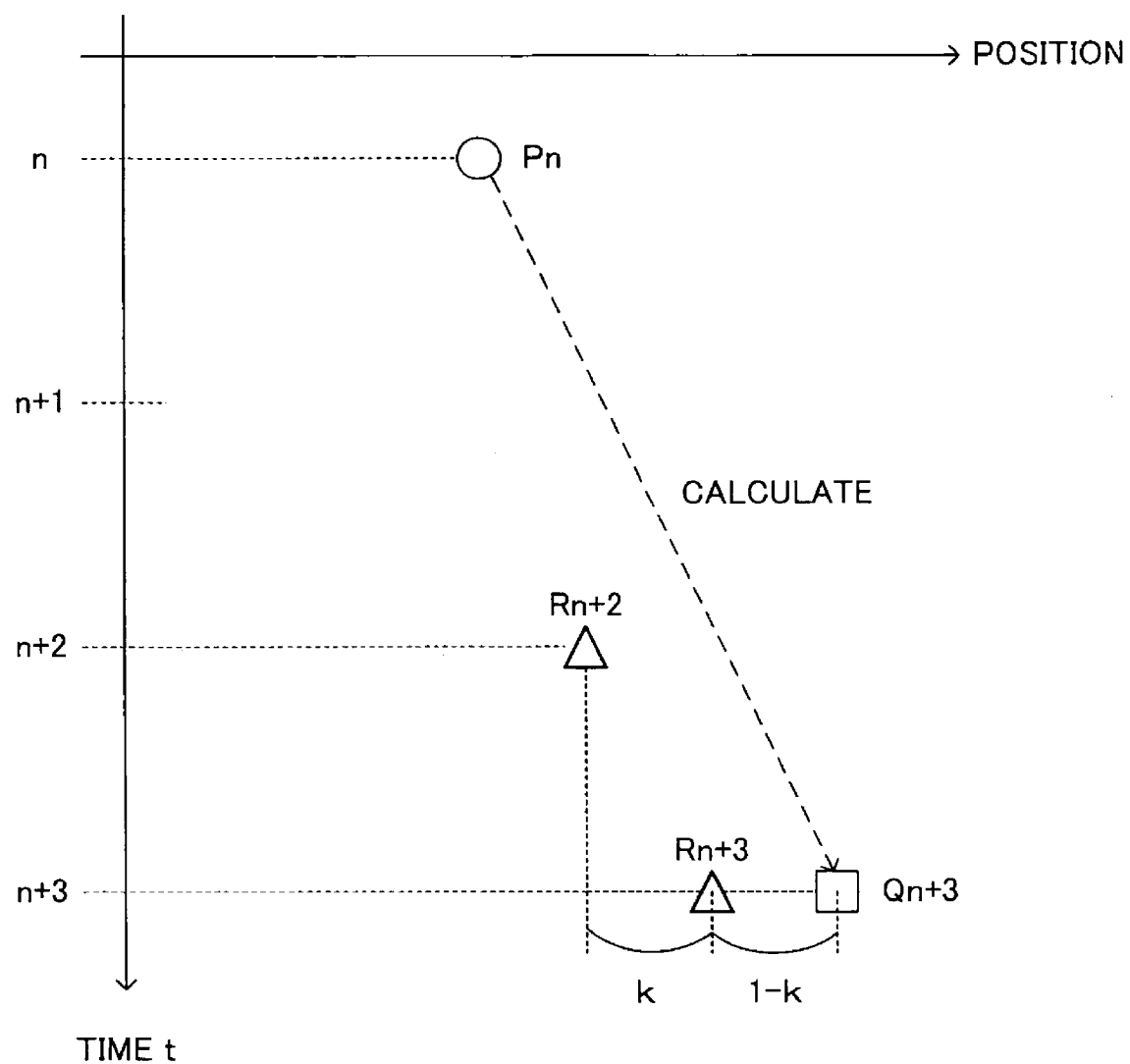
FIG. 7 is a diagram for describing a calculation processes executed at frame of time n+3.
Figure 8:
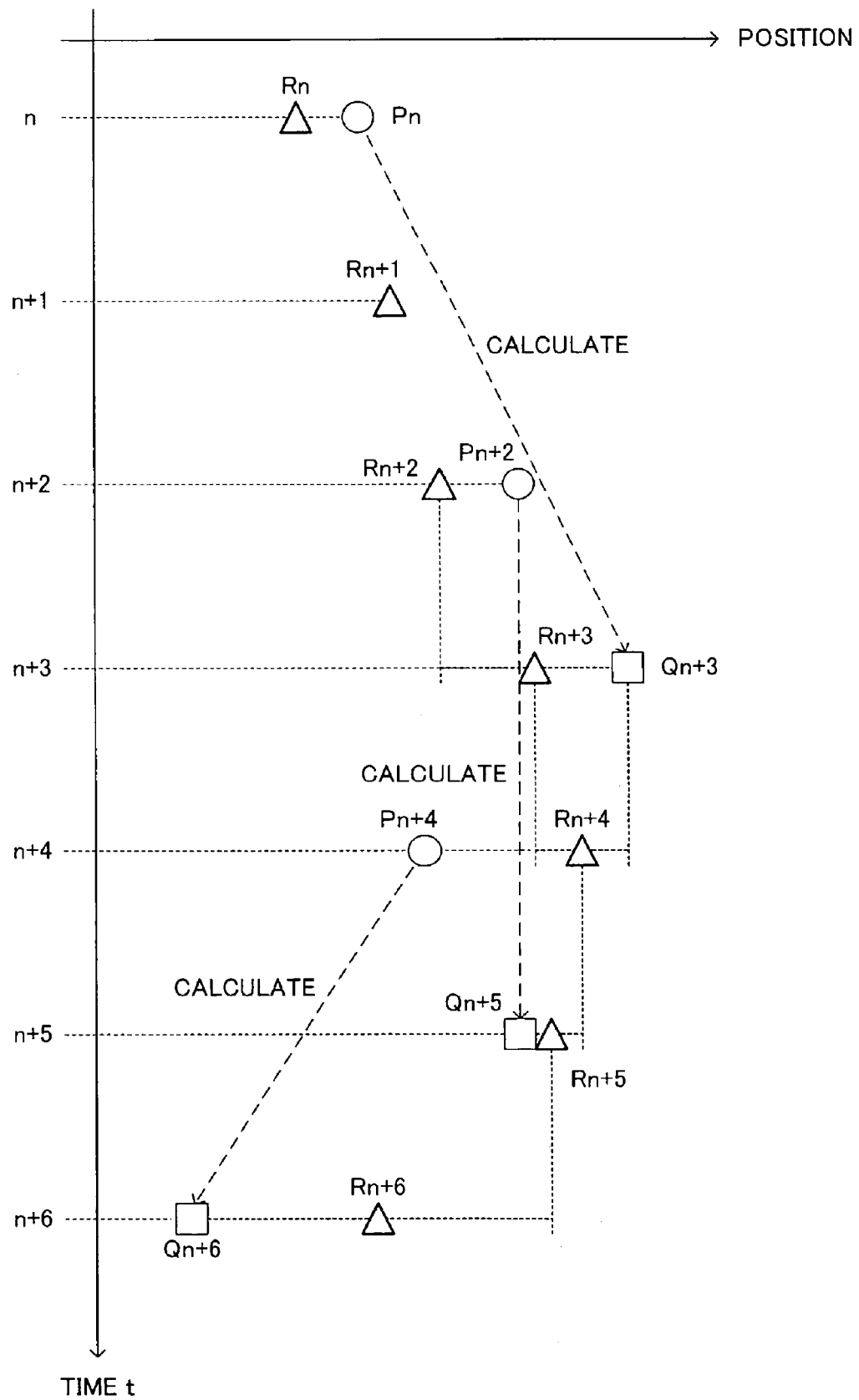
FIG. 8 is a diagram showing movements of the second cart between times t=n through t=n+6.

Next, details of the calculation process will be described with reference to FIGS. 6 through 8. Here, the calculation process that is executed when the calculation data is transmitted at the timings as shown in FIG. 5, will be described. FIGS. 6 through 8 each are diagrams for describing such calculation process. In FIGS. 6 through 8, a vertical axis represents time t (elapsed time) and a horizontal axis represents positions of the second cart. It is to be appreciated in FIGS. 6 through 8 that although positions of the second cart will be, for clarity of description, depicted in a one-dimensional manner (e.g., the position of the cart is indicated with respect to its position on the x-axis, but not with respect to y-axis or z-axis), the positions of the second cart can also be depicted in a two-dimensional manner (e.g., the position of the cart is indicated with respect to its position on the x-axis and the y-axis) or a three-dimensional manner. Further, in FIGS. 6 through 8, positions indicated by circles represent actual positions of the second cart, that is, the circles represent positions where the second cart is at given frames of time as calculated by the second game device 10*b*. Positions indicated by squares represent positions of the second cart as calculated by the first game device 10*a* based on the calculation data. Positions indicated by triangles represent positions of the second cart as determined by the first game device 10*a*. Further, FIG. 6 is a diagram showing actual movements of the second cart. Hereinafter, with reference to FIGS. 7 and 8, the calculation process executed by the first game device 10*a* when the second cart moves as shown in FIG. 6 will be described.

FIG. 7 is a diagram for describing a calculation process executed at time t=n+3. In FIG. 7, it is assumed that position Rn+2 has been predetermined as a position of the second cart at time t=n+2. As shown in FIG. 5, the first game device 10*a* receives at time t=n+3 the calculation data which includes data representing the position of the second cart as of time t=n. Then the first game device 10*a* calculates, by using the calculation data, calculated position Qn+3 of the second cart as of time t=n+3. Note that although details of a calculation method for calculating the calculated position of the cart will be described in a space below, any method can be applied to the calculation method for calculating the calculated position.

After calculating calculated position Qn+3, the first game device 10*a* determines, based on position Rn+2 (the position of the second cart as of time t=n+2) of the second cart from a previous frame of time and calculated position Qn+3, position Rn+3 of the second cart as of time t=n+3. More specifically, position Rn+3 is determined by internally dividing two positions (e.g., r position Rn+2 of the second cart from the previous frame of time and calculated position Qn+3) so as to be k:1−k (where 0<k<1). Note that, preferably, a value for k is set appropriately in accordance with a degree of a delay of communication between game devices. As described above, according to the present embodiment, a new position of the second cart is to be a position between a position from a previous frame of time and the calculated position.

FIG. 8 is a diagram showing the movements of the second cart between times t=n through t=n+6. Note that it is assumed that positions of the second cart Rn, Rn+1 and Rn+2 at times t=n through t=n+2, respectively, have already been determined by a same method (described in a space below) used to determine positions Rn+3 through Rn+6. In FIG. 8, a determination method for determining position Rn+3 of the second cart as of time t=n+3 is as shown in FIG. 7.

Next, a determination method for determining position Rn+4 of the second cart as of time t=n+4 will be described. As shown in FIG. 5, as of time t=n+4, the first game device 10*a* has not yet received the calculation data. At time t=n+4, the first game device 10*a* determines, in accordance with the calculated position calculated by using the most recent calculation data thus far, a current position of the second cart. More specifically, position Rn+4 of the second cart as of time t=n+4 is determined by internally dividing two positions (e.g., position Rn+2 of the second cart from the previous frame of time and the calculated position Qn+3) so as to be k:1−k (where 0<k<1).

At time t=n+5, the first game device 10*a* receives the most recent calculation data transmitted by the second game device 10*b*. The calculation data represents position Pn+2 of the second cart as of time t=n+2. The first game device 10*a* calculates, by using the calculation data, a new calculated position, Qn+5. Further, position Rn+5 of the second cart as of time t=n+5 is determined, in a same manner of calculation executed at time t=n+3, by internally dividing two positions (e.g., position Rn+4 from the previous frame of time and above-stated calculated position Qn+5) so as to be k:1−k (where 0<k<1).

At time t=n+6, the first game device 10*a* receives the most recent calculation data transmitted by the second game device 10*b* in a same manner as at time t=n+5. Therefore, the first game device 10*a* executes a same process executed at time t=n+5, and thereby determining position Rn+6 of the second cart as of time t=n+6. That is, the first game device 10*a* calculates based on the most recent calculation data calculated position Qn+6, and determines position Rn+6 based a calculated position Qn+6 and position Rn+5 from the previous frame of time.

At times t=n through t=n+2, positions of the second cart are determined in the same manner as at times t=n+3 through t=n+6. That is, at times t=n through t=n+2, based on an assumption that calculated positions had already been calculated, a position for a respective frame of time is determined based on the calculated positions and positions from a respective previous frame of time.

As described above, according to the present embodiment, the game device at the transmitting end transmits data representing information such as a position of an own cart operated thereby; and upon receiving such data, the game device at the receiving end calculates the position of the cart operated by the game device at the transmitting end. Now, if the calculation is to be executed by the game device at the transmitting end, there is a problem in which by the time a result of such calculation is received by the game device at the receiving end, such result is already outdated and no longer useful. To this end, according to the present embodiment, since the calculation is executed by the game device at the receiving end, aforementioned problem, which would occur if calculations are to be executed by the game device at the transmitting end, is solved, and thereby allowing accurate calculations to be made.

Also, according to the present embodiment, the current position of the cart is determined based on the calculated position and the position from a previous frame of time. That is, a position between the calculated position and the position from the previous frame of time is determined to be the current position. Now, consider a case where the calculated position is to be the current position. In such case, in a frame of time where calculation data is not received the current position is not updated, and therefore, the calculated position remains at the same position as that in a previous frame of time, and consequently, the current position also remains as that in the previous frame. In frames of time in which the calculation data is not received, carts that are operated by other game devices appear to move only once in a plurality of frames of time, and therefore the other carts are not displayed smoothly. For this, carts operated by other game devices will not appear to be moving smoothly on the display.

Therefore, according to the present embodiment, the calculated position calculated based on calculation data is not taken the current position of the cart. The current position is determined based on the calculated position and the position from a previous frame of time (see time t=n+4 shown in FIG. 8). By this, even in frames of time in which calculation data is not received the current position of the cart is different from that in a previous frame of time, and therefore, the cart is moving in every frame of time regardless of a reception status of the calculation data. Thus, carts operated by other game devices appear naturally.

Figure 9:
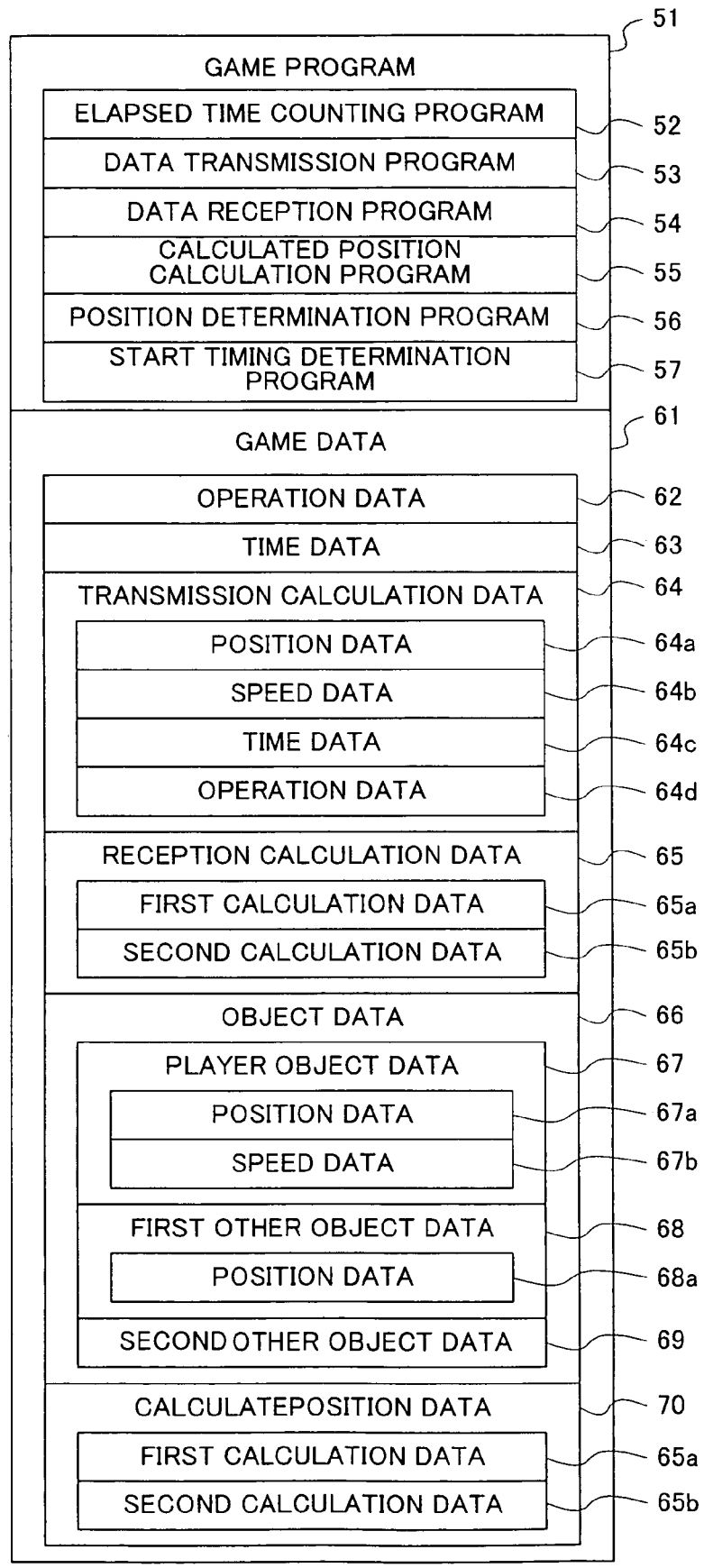
FIG. 9 is a diagram showing principle data stored in RAM 24 in a game device 10.

Next, details of game processes to be executed by the game device 10 when a game program according to the present embodiment is executed will be described. First, principle data used for the game process will be described with reference to FIG. 9. FIG. 9 is a diagram showing principle data stored in the RAM 24 in the game device 10. As shown in FIG. 9, in the RAM 24, a game program 51 and game data 61 are stored.

In the game program 51, an elapsed time counting program 52, a data transmission program 53, a data reception program 54, a calculated position calculation program 55, a position determination program 56, and a start timing determination program 57 are included. The elapsed time counting program 52 is a program for executing processes for measuring an elapsed time of a predetermined event since the event started in the game. In the present embodiment, what is meant by the predetermined event is to start a racing game. The data transmission program 53 is a program for executing processes for transmitting the aforementioned calculation data to other participating game devices. The data reception program 54 is a program for executing processes for receiving the calculation data from other participating game devices, and for storing therein the received calculation data. The calculated position calculation program 55 is a program for executing processes for calculating, based on at least position data and time data included in the received calculation data, a calculated position, of an object (cart), as of when the calculation data is received. The position determination program 56 is a program for executing processes for determining, based on the calculated position, a position of the object (cart) in a game space as of when the calculation data is received. The start timing determination program 57 is a program for executing processes for simultaneously starting the aforementioned event among the game devices 10a through 10c. Note that in the game program 51, besides the aforementioned programs, various programs and the like necessary for executing the racing game are to be included.

On the other hand, in the game data 61, operation data 62, time data 63, transmission calculation data 64, reception calculation data 65, object data 66 and calculated position data 70 are included. Now, in the RAM 24, besides data shown in FIG. 9, a value for a counter i (described later), data for land configuration for racecourses, image display or the like, and data necessary for racing games are stored. In FIG. 9, data stored in the RAM 24 in the first game device 10a will be used as example for the description; similar data is to be stored in other game devices 10b and 10c.

The operation data 62 is data which represents information concerning game operation executed on the operation switch section 14 of the game device 10. The operation data 62 is data that represents, for example, a status (whether or not each switch is, or has been pressed) of each of switches in the operation switch section 14. Here, the operation data 62 is data that represents whether or not a button (e.g., A button 14d) for accelerating a cart has been pressed. Note that, in other embodiments, the operation data 62 can include data that represents an operation status of a button (e.g., the cross switch 14a) for changing a direction in which the cart moves.

The time data 63 is data that represents time in the game. According to the present embodiment, the time data 63 is data that represents the elapsed time since a race has started in units of frame of time. The time data 63 is to be updated per frame of time once the race starts.

The transmission calculation data 64 is data that is transmitted, as calculation data, from the game device 10 to other game devices. In the transmission calculation data 64, position data 64a, velocity data 64b, time data 64c, and operation data 64c are included. The position data 64a is data that represents a position of the cart (own cart) operated by the game device 10. The velocity data 64b is data that represents a velocity of the own cart. According to the present embodiment, velocity of the cart is expressed by a combination of a scalar value which represents speed, and a value which represents a direction (based on a predetermined direction in the game space) of the speed. That is, the velocity data comprises data for the scalar value representing the speed of the cart and data for the direction of the speed. The time data 64c is data that represents time in which the transmission calculation data 64 is generated. Operation data 64d is the operation data 62 as of time that is represented by the time data 64c. That is, as of when the transmission calculation data 64 is generated, the operation data 64d and operation data 62 have same contents with each other.

The reception calculation data 65 is the calculation data that is transmitted to the game device 10 from other game devices. The game device 10 calculates, by using the reception calculation data 65, calculated positions of carts operated by other respective game devices. The reception calculation data 65 includes as many pieces of calculation data as the number of game devices that are participating in the same game. According to the present embodiment, the game system comprises three game devices, and therefore, in the reception calculation data 65, first calculation data 65a and second calculation data 65b are included. In the first game device 10a, the first calculation data 65a is the calculation data transmitted thereto from the second game device 10b; the second calculation data 65b is the calculation data transmitted thereto from the third game device 10c. Contents of the reception calculation data 65 are to be updated each time calculation data is received from other game devices.

The object data 66 is data that represents information concerning the object (cart) that is in the racing game. In the object data 66, player object data 67, first other object data 68 and second other object data 69 are included.

The player object data 67 is data that represents information concerning a cart (own cart) which is an object operated by using the game device 10. In the player object data 67, position data 67a and velocity data 67b are included. The position data 67a is data that represents a position of the own cart. The velocity data 67b is data that represents a velocity of the own cart. The position data 67a and the velocity data 67b are to be included in the transmission calculation data and transmitted to other game devices.

The first other object data 68 and the second other object data 69 are data that represent information concerning carts (carts operated by other game devices) which are objects operated by using the game devices other than the game device 10. In the first game device 10a, the first other object data 68 is data that represents information concerning the second cart; and the second other object data 69 is data that represents information concerning the third cart. In the first other object data 68, position data 68a is included. The position data 68a is data that represents a position of a first other object (for the first game device 10a, the second cart). Although not shown in FIGS, in the second other object data 69, position data that represents a position of a second other object (for the first game device 10a, the third cart) is included in a same manner as in the first other object data 68.

The calculated position data 70 is data that represents the aforementioned calculated position, which is calculated by using the calculation data. In the calculated position data 70, first calculated position data 70 and second calculated position data 70b are included. The first calculated position data 70a is data that represents a calculated position of the first other object; and the second calculated position data 70b is data that represents a calculated position of the second other object.

Figure 10:
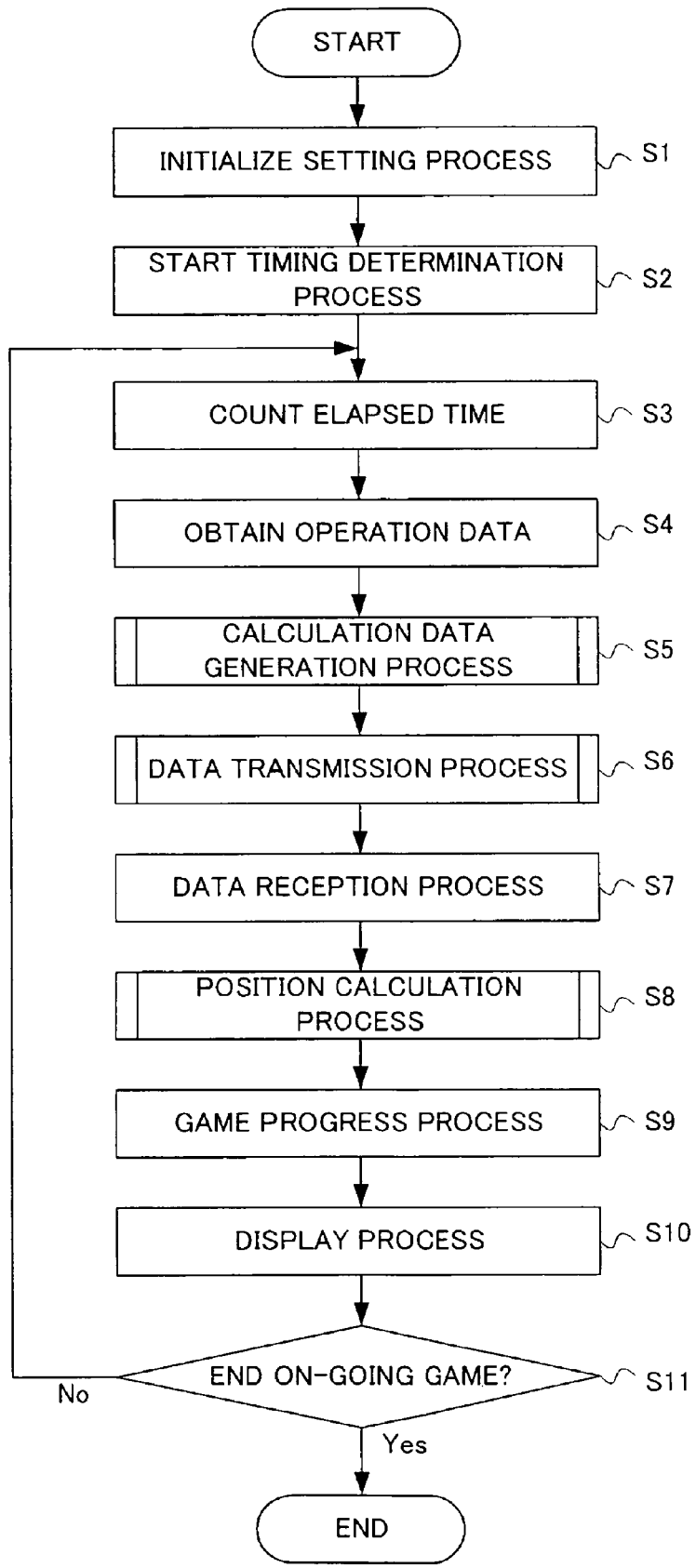
FIG. 10 is a main flowchart showing a series of processes for the game which is executed by the game device 10.

Next, details of game processes to be executed when the game device 10 executes the game program will be described with reference to FIGS. 10 through 13. FIG. 10 is a main flowchart showing a series of processes of the game which is executed by the game device 10. Once power is supplied to the game device 10, the CPU core 21 of the game device 10 executes a start up program stored in a boot ROM (not shown in FIGS.); units such as the RAM 24 are initialized; the game program stored in the memory card 17 is read by the RAM 24; and then, the CPU core 21 starts executing the game program.

The flowchart shown in FIG. 10 is a flowchart for showing game processes which will be executed after the aforementioned processes are complete. Note that in FIGS. 10 through 13, processes for determining current positions of other carts are shown in details, and that details concerning game processes that are not related to the example embodiment presented herein are omitted.

First, an initialization process is executed in step S1 shown in FIG. 10. In the initialize setting process, the CPU core 21 sets a number of carts which are operated through respective game devices included in the game system, and sets a characteristic ID for each game device. Also, the CPU core 21 assigns each participating game devices, besides the own device, with a number. Hereinafter, according to the first game device 10a, the second game device 10b is assigned with "G1" and the third game device 10c is assigned with "G2". Also, in the initialize setting process, "1" as a value for the counter i (where i is a natural number) which indicates the aforementioned number is stored in the RAM 24, and a number j (in the present embodiment: j=2) of game devices besides the own device is also stored in the RAM 24. Also, in the initialize setting process, a game space for the racing game is generated and the own cart and carts operated by other game devices are arranged at initialized positions in a racecourse.

In a next step, step S2, the start timing determination program 57 is executed, and thus, a start timing determination process is executed. The start timing determination process is a process executed so as to synchronize a timing, at which the race starts, among all the participating game devices. The start timing determination process can be executed by any method as long as the chosen method is for, to an extent, synchronizing a timing, in which the race starts, among all the participating game devices. For example, the delay time in communication among game devices is measured, and then a predetermined game device informs other game devices remaining time until the race starts with the measured delay time taken into account. Further, at an end of step S2, the CPU core 21 sets a content of the time data 63, which is stored in the RAM 24, as "0 frame of time".

As a result of step S2, the race starts essentially in a synchronized manner among the game devices. That is, due to above-stated step S2, a loop of processes of steps S3 through S11 is to be executed. Due to the repeated processes of steps S3 through S11, carts are moved as operated by respective players and therefore, the race proceeds. Note that the loop of processes executed in steps S3 through S11 is to be executed once per frame of time.

In step S3, the elapsed time counting program 52 is executed, and thus, an elapsed time is counted. That is, the CPU core 21 updates the value represented by the time data 63 by adding 1 to the value. In a following step, step S4, operation data is obtained. The CPU core 21 obtains from the operation switch section 14 data which represents an operation status of each switch in the operation switch section 14. Here, according to the present embodiment, data which represents whether or not a button (e.g., A button 14d) for accelerating a cart is pressed is stored in the RAM 24 as the operation data 62.

In step S5, a calculation data generation process for generating the calculation data is executed. Hereinafter, with reference to FIG. 11, details of the calculation data generation process will be described.

Figure 11:
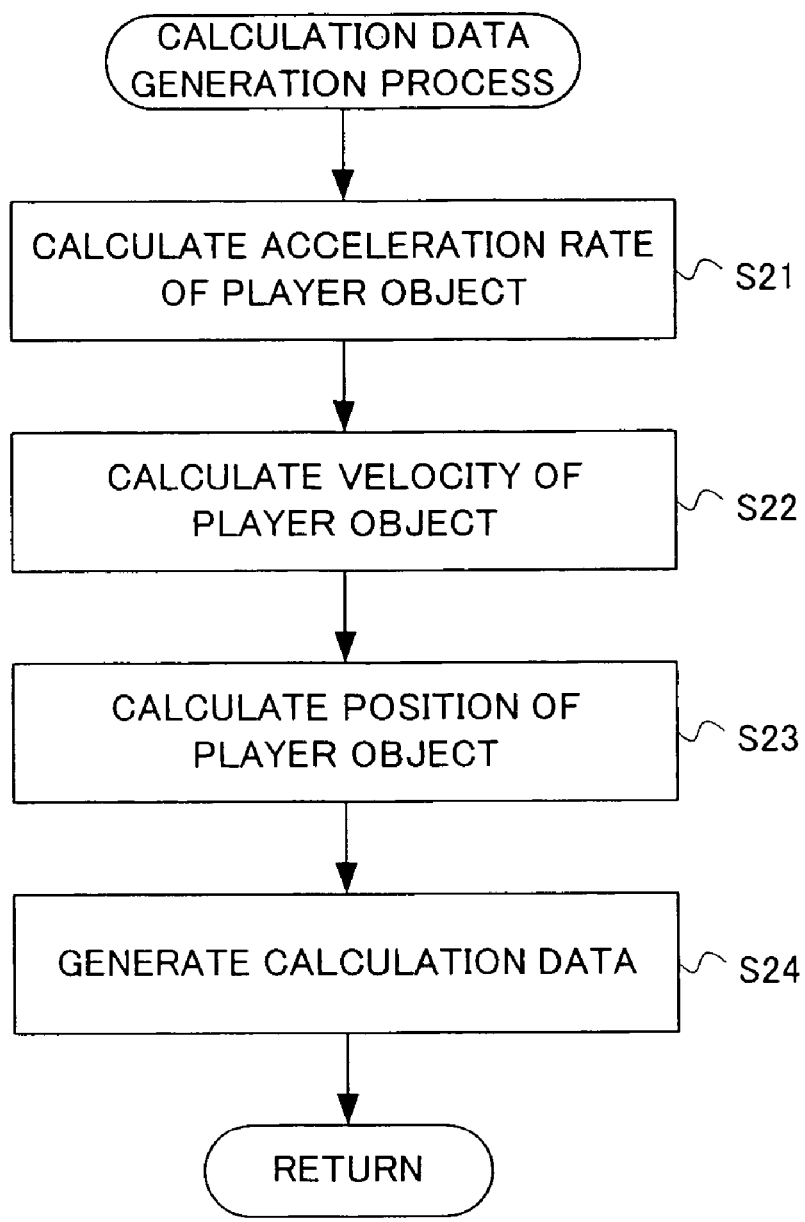
FIG. 11 is a flowchart showing, in detail, a series of procedures executed in step S5 of the main flowchart shown in FIG. 10.

FIG. 11 is a flowchart showing, in detail, a series of processes executed for step S5 shown in FIG. 10. In the calculation data generation process, first, in step S21, acceleration rate of a player object (own cart) is calculated based on the operation data obtained in step S4. The acceleration rate is calculated based on a status of a pressed button (e.g., A button 14d). For example, the CPU core 21 sets a value for the rate of acceleration to a predetermined value if the button is pressed, and sets the value for the acceleration rate to 0 if the button is not pressed. Further, in another example, it can be set such that the acceleration rate is calculated in accordance with a length of time in which the button remains pressed. Furthermore, if the button is operable to detect an analog quantity, the acceleration rate can be calculated in accordance with a detected analog quantity.

In a following step, step S22, velocity of the own cart is calculated based on the acceleration rate which is calculated in step S21. Although a calculation method for calculating the velocity can be varied, a following method is applied for calculating the velocity in the present embodiment. First, as stated above, according to the present embodiment, velocity of the own cart is expressed by a combination of the scalar value which represents speed, and a value which represents the direction of the speed. The velocity for a current frame of time is obtained by adding the velocity from a previous frame of time to the above-stated acceleration rate (scalar value). Also, the direction of the speed for the current frame of time is calculated based on the direction from the previous frame of time and on the status of whether or not either left or right key of the cross key 14a is being pressed. The data representing the velocity, which is calculated in step S22, of the own cart is stored as velocity data 67b in the RAM 24.

In a following step, step S23, a new position of the own cart is calculated. The position of the own cart is calculated based on the velocity, which is calculated in step S22, and the position of the own cart from the previous frame of time. That is, the new position of the own cart is a position such that it is apart from the position from the previous frame of time in accordance with the speed and the direction thereof. Data concerning the position calculated in step S23 is stored as position data 67a in the RAM 24.

In a following step, step S24, the calculation data is generated. That is, the CPU core 21 stores as the transmission calculation data 64 in the RAM 24 the velocity data 67b obtained in step S22, the position data 67a obtained in step S23, the time data 63, which is currently stored in the RAM 24, and the operation data 62. The transmission calculation data 64 which is stored in the RAM 24 is to be transmitted to other game devices in step S6 and thereafter. After aforementioned step S24, the CPU core 21 ends the calculation data generation process.

Returning to the description of FIG. 10, in step S6, the data transmission program 53 is executed, and thus, the data transmission process is executed. The data transmission process is a process for transmitting the calculation data generated in step S5 to other game devices. Hereinafter, the details of the data transmission process will be described with reference to FIG. 12.

Figure 12:
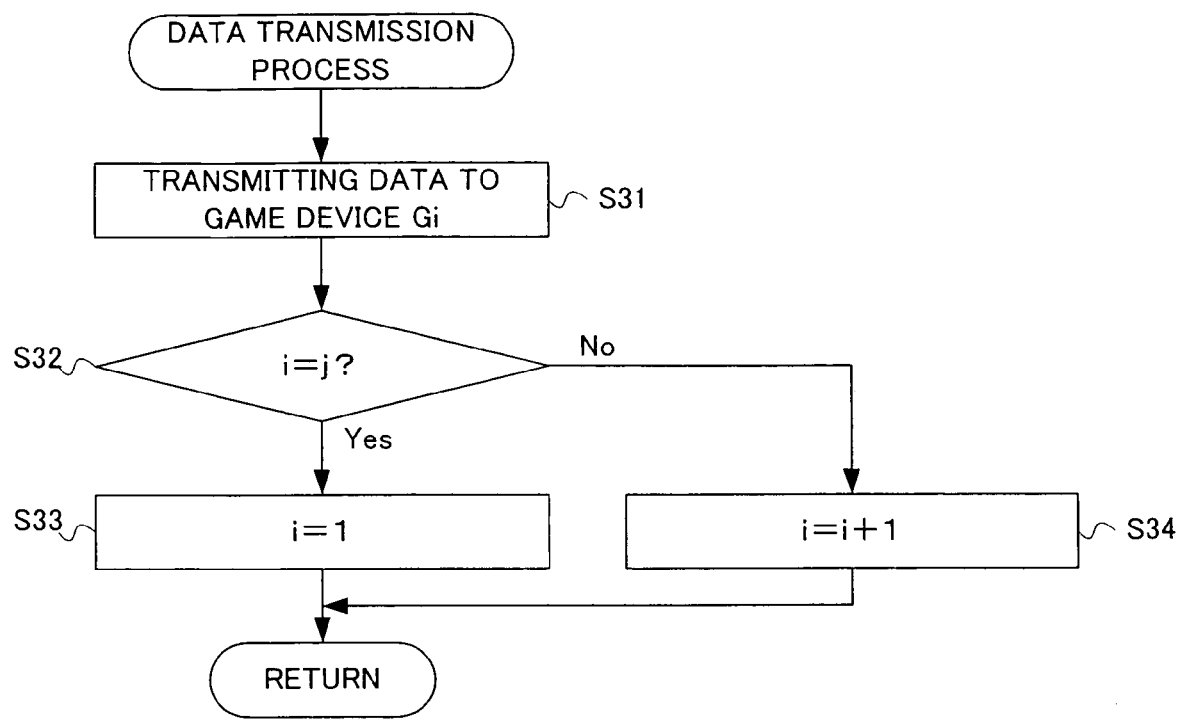
FIG. 12 is a flowchart showing, in detail, a series of procedures executed in step S5 of the main flowchart shown in FIG. 10.

FIG. 12 is a flowchart showing, in detail, a series of procedures executed in step S5 of the main flowchart shown in FIG. 10. In the data transmission process, first, the calculation data generated in step S24 is transmitted to the game device G1 in step S31. Here, the game device G1 is a game device whose number is, according to other game devices, assigned as "i". Further, "i" is a value for the aforementioned counter i. For example, if the value for the counter i currently stored in the RAM 24 is "1", the calculation data is transmitted to the game device G1; and if the value for the counter i is "2", the calculation data is transmitted to a game device G2.

In step S32, the CPU core 21 determines whether or not the value for the counter i stored in the RAM 24 equals a number "j" (where j, in the present embodiment, equals 2) of other participating game devices. When the value for the counter i equals j based on the determination, a process for step S33 is to be executed. That is, in step S33, the value for the counter i is set as "1". On the other hand, when the value for the counter i does not equal j, step S34 is to be executed. That is, in step S34, the value for the counter i is incremented by 1. After step S33 or S34, the CPU core 21 ends the data transmission process.

Due to the processes executed in the aforementioned steps S32 through S34, in a next frame of time, the calculation data is transmitted to a game device other than the game device to which the calculation data is transmitted in the current frame of time. The processes executed in steps S32 through S34 are for transmitting the calculation data to one game device after another game device provided that a plurality of other game devices are participating in the same game.

Returning to the description of FIG. 10, in step S7, the data receiving program 54 is executed, and thus, a data receiving process is executed. More specifically, the CPU core 21 determines whether or not the calculation data has been received from other game devices. Then, if the calculation data has been received, the received calculation data is stored in the RAM 24 as reception data 65. Note that the calculation data is to be separately stored in the RAM 24 in accordance with the game device at a transmitting end. That is, in the first game device 10a, the calculation data transmitted thereto from the second game device 10b is to be stored in the RAM 24 as an updated calculation data 65a; and the calculation data transmitted thereto from the third game device 10c is to be stored in the RAM 24 as an updated calculation data 65b. Note that the calculation data received from other game devices include, in a same manner as the calculation data which is transmitted to other game devices, the position data 64a, the velocity data 64b, the time data 64c and the operation data 64d.

In step S8, a position calculation process, which is for calculating current positions of other carts, is executed. Hereinafter, details concerning the position calculation process will be described with reference to FIG. 13.

Figure 13:
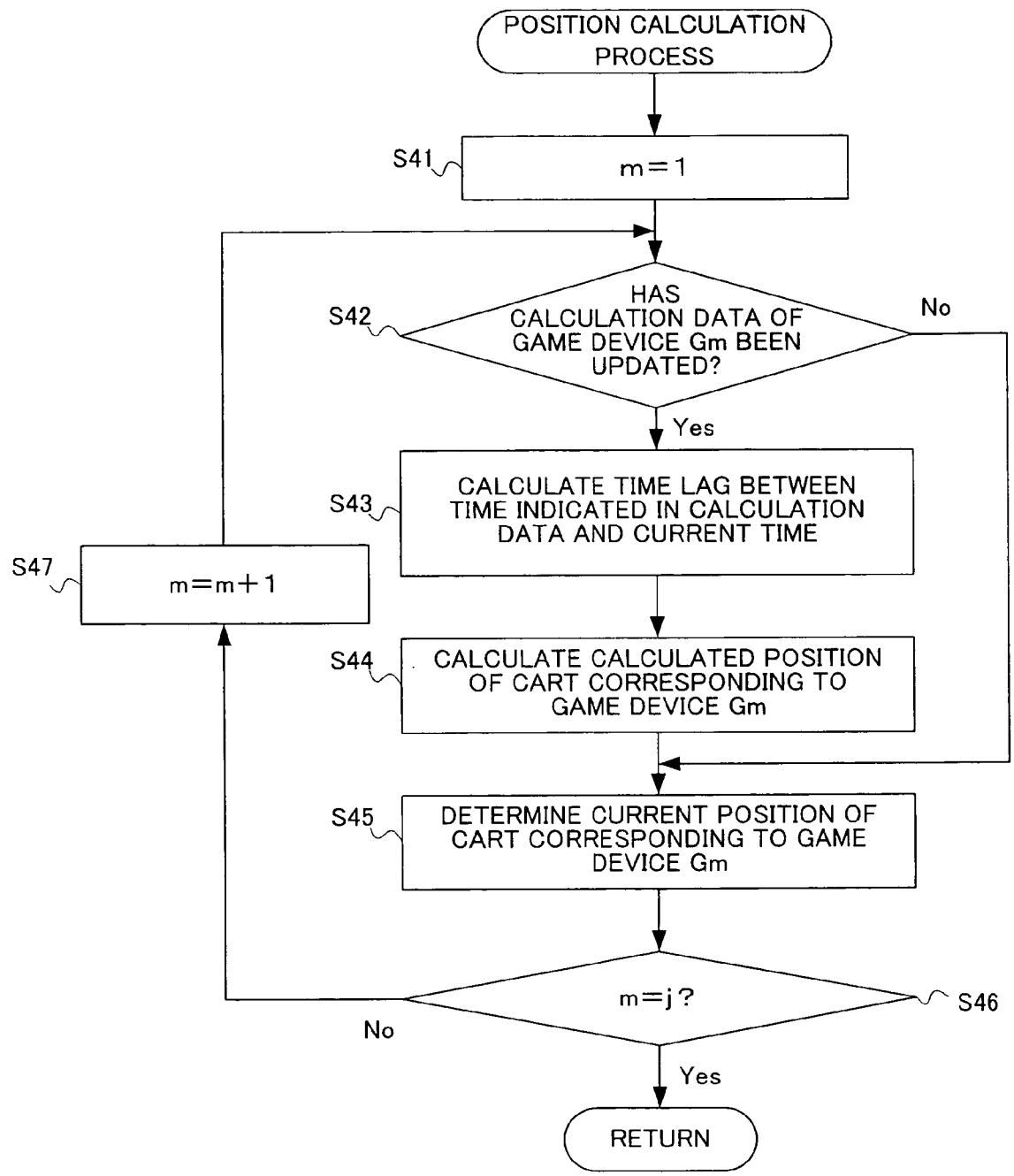
FIG. 13 is a flowchart showing, in detail, a series of procedures executed in step S8 of the main flowchart shown in FIG. 10.

FIG. 13 is a flowchart showing, in details, a series of procedures executed in step S8 of the main flowchart shown in FIG. 10. In the position calculation process, first, a value for a counter m is set as 1 in step S41. Such value for the counter m is stored in the RAM 24. In a following step, step S42, the CPU core 21 determines whether or not the calculation data of a game device Gm has been updated in step S7 for the current frame of time. Here, the game device Gm is a game device whose number is, according to other game devices, assigned as "m". Further, "m" is a value for the aforementioned counter m. For example, if the value for the counter m currently stored in the RAM 24 is "1", whether or not the calculation data (the first calculation data) in the game device G1 has been updated is determined; and if the value for the counter m is "2", whether or not the calculation data (the second calculation data) in the game device G2 has been updated is determined. When it is determined, based on the above-stated determination, that the calculation data in the game device Gm has been updated, a process for step S43 is executed. On the other hand, when it is determined that the calculation data in the game device Gm has not been updated, processes for steps S43 and S44 are skipped so as to execute step S45. The processes for steps S43 and S44 are processes, which will be executed by the calculated position calculation program 55, for calculating based on the calculation data calculated positions.

In step S43, a time lag Δt between time represented in the calculation data and current time is calculated. The calculation data is the calculation data, which is received from the game device Gm in step S8. More specifically, the CPU core 21 calculates a difference between time represented in the time data, which is included in the reception calculation data 65 stored in the RAM 24, and time represented in the time data 63, which is stored in the RAM 24.

In a following step, step S44, the position of the cart operated by using the game device Gm is calculated. The position of the cart is calculated by using the time lag Δt which is calculated in step S43 and all pieces of data included in the calculation data. Note that the calculation data is the calculation data, which is received from the game device Gm in step S8. In the present embodiment, the calculated position is indicated by the calculated distance and the calculated direction. What is meant by the calculated distance is a distance between a position (a base position; for example, position Pn shown in FIG. 7), which is indicated according to the position data included in the calculation data, and the calculated position (e.g., position Qn+3 shown in FIG. 7). What is meant by the calculated direction is a relative direction to the calculated position from the base position.

A calculated distance Pe is calculated based on V representing velocity which is indicated by the velocity data included in the calculation data, acceleration rate a which is calculated based on the operation data included in the calculation data, and the aforementioned time lag Δt. That is, the CPU core 21 calculates the calculated distance Pe in accordance with a following equation:

$$Pe = V \times \Delta t \times (\tfrac{1}{2}) \times a \times (\Delta t)^2.$$

Here, "a" in the equation above represents the acceleration rate of the cart, and is calculated based on the operation data included in the calculation data. A calculation method for calculating the acceleration rate a is same as that in step S21. On the other hand, the aforementioned calculated direction is determined in accordance with the direction of the speed indicated by the velocity data which is included in the calculation data. The calculated position is determined based on the calculated distance which is calculated as described above, and the calculated direction. That is, the calculated position is a position such that it is apart from the base position as much as the calculated distance in the calculated direction. Data concerning the determined calculated position is to be stored in the RAM 24 as the calculated position data 70. After step S44, a process for step S45 is executed.

In step S45, the position determination program 56 is executed, and thus, a current position of the cart operated by using the game device Gm is determined. The current position (e.g., position Rn+3 shown in FIG. 7) is determined based on the calculated position (e.g., calculated position Qn+3 shown in FIG. 7), which is calculated in step S44, and the position (e.g., position Rn+2 shown in FIG. 7) of the cart from the previous frame of time. More specifically, the current position is determined by internally dividing two positions (e.g., the position of the cart from the previous frame of time and the calculated position) so as to be k:1−k (where 0<k<1). Data concerning the determined current position is to be stored in the RAM 24 as position data 68a or as position data 69a respectively included in object data 68 or 69, which corresponds to the respective carts operated by the game device Gm.

In the position calculation process, processes executed in aforementioned steps S42 through S45 are executed for each participating game device. That is, in step S46, it is determined whether or not the value for the counter m equals a number "j" (where j, in the present embodiment, equals 2) of other participating game devices. When the value for the counter m does not equal j based on the determination, a process for step S47 is to be executed. That is, in step S47, the value for the counter m is incremented by 1. Then, the process of step S42 is executed again after step S47. Hereafter, the processes of steps S42 through S45 will be repeated until the value for the counter m equals j. On the other hand, when the value for the counter m equals j based on the determination in step S46, the CPU core ends the position calculation process.

Returning to the description of FIG. 10, in step S9, which is a step executed after step S8, a game progressing process is executed. In the game progressing process, necessary processes for a progress of the racing game are executed. For example, when the cart uses an item, a process concerning the item is executed; and when there is a cart whose motions are controlled by the game device 10, a process for determining the position of the cart is executed.

In a following step, step S10, a game image is generated in accordance with a result of the processes of steps S5 though S9, and the game image is displayed in the second LCD 12. In a following step, step S11, it is determined whether or not to end the ongoing racing game. The CPU core 21 determines whether or not to end the ongoing racing game depending on, for example, whether or not all carts participating in the race finished the race, or whether or not a predetermined period of time has passed since the race started. When it is determined to end the racing game based on a result of the determination, the CPU core 21 ends the processes shown in FIG. 10. On the other hand, when it is determined not to end the racing game, the process of step S3 is executed again. Hereinafter, until it is determined to end the racing game, the ongoing racing game continues with the processes of steps S3 through S11 being repeatedly executed. Above concludes the description of the game process according to the present embodiment.

Note that, in the present embodiment, the calculated position is calculated based on: positions of other carts operated respectively by other participating game devices; time in which those carts are at the respective positions; speed of other carts; and the operation data concerning other carts. The calculated position can also be calculated by using history of past positions of the carts based on positions of other carts and time in which the carts are at those positions respectively. Therefore, the game device is operable to calculate the calculated positions without using the current speed of other carts or the operation data.

Also, in the present embodiment, the current position of the cart is determined based on its calculated position and its position from a previous frame of time. In another embodiment, however, the calculated position can be the current position. When the calculated position is regarded as the current position, an amount of processes required for calculating the current position is reduced. However, when the calculated position is used as the current position, it is to be appreciated that, in a frame of time, in which the calculation data is not received, the current position remains the same as that in the previous frame of time, and therefore, the carts operated by other game devices will not appear to be moving smoothly on the display.

Further, in the present embodiment described above, the calculated position calculated based on the calculation data is a calculated position as of when the calculation data is received. In another embodiment, however, the calculated position calculated based on the calculation data can be a calculated position at a time in a predetermined period of time after the calculation data is received. For example, referring to the description of FIG. 7, it can be set such that the game device calculates at time t=n calculated position Qn+x as of time t=n+x. More specifically, the process for step S44 can be executed by adding the x stated above to the time lag Δt calculated in step S43. Note that the point in time in the predetermined period of time is in the future as of when the calculation data is received, and can be determined when the calculation data is received. Further, a value for the x can be determined in advance. Furthermore, the value for the x can be different per game device. For example, if the delay time in communication between the own game device and another game device is to be measured, the value for the x can be determined for each game device by taking the measured delay time into account. Note that even when setting the point in time after the calculation data is received, the process for step S45 is to be executed in a same manner.

Further, in the present embodiment described above, the position of the object (cart) in the game space is to be calculated. In another embodiment, however, an inclination of the object, besides the position thereof, can be calculated. When the inclination of the object is to be calculated, the game device transmits to other game devices the calculation data including inclination data, which represents the inclination of the object. The game device at the receiving end calculates, by using the inclination data included in the calculation data, a calculated inclination of the object as of when the calculation data is received. As for a calculation method for calculating the calculated inclination, a method in which a change of degree of the object is calculated based on the calculation data received in a current frame of time and the calculation data received in a previous frame; and the calculated inclination is calculated based on the change of degree and the inclination data included in the calculation data received in the current frame of time, may be used. Another method for the calculation method is a method in which the game device at the transmitting end transmits to other game devices the calculation data which includes data representing the change of degree concerning the inclination of the cart, and the game device at the receiving end calculates the calculated inclination of the cart based on the data representing the change of degree concerning the inclination of the cart. Further, the game device which calculates the calculated inclination of another cart can set the calculated inclination as the current inclination of the cart. Furthermore, the game device can determine the inclination of the cart based on the calculated inclination from a previous frame and the aforementioned calculated inclination. Note that the inclination of the cart can be depicted, for example, in terms of angles in a world coordinate system having 0 degree as the reference direction.

Further, in the present embodiment described above, the present invention is described as the invention being applied to the racing game. The present invention is, however, applicable to any game in which a plurality of objects are operated respectively by a plurality of game devices which are connected to each other through a network. For example, the present invention is applicable to an action game in which a plurality of characters move within a game space.

The present invention accurately executes a calculation of calculated positions of objects operated respectively by other game devices, and can be used as a communication game system or a communication game program for a purpose of executing accurate calculations.

While the example embodiment presented herein has been described in detail, the foregoing description is in all aspects illustrative and not restrictive. It is understood that the numerous other modifications and variations can be devised without departing from the scope of the example embodiment.

What is claimed is:

1. A non-transitory computer readable storage medium having stored therein a communication game program executed in a computer of a game device included in a communication game system in which a plurality of game devices are connected to each other through a network, the communication game program causing the computer to execute:

receiving from another game device calculation data including, at least, position data representing a position of an object, in a game space, operated by the other game device, and time data representing time at which the object is at the position;

calculated position calculation for calculating, based on the position data and the time data included in the calculation data received in the receiving, a calculated position of the object at a time in a predetermined period of time, the time in the predetermined period of time being determined in accordance with when the calculation data is received;

calculated position update for, when the calculation data is received in the receiving, updating the calculated position based on the received calculation data, and for, when the calculation data is not received in the receiving, maintaining the calculated position calculated based on calculation data that is received in the receiving the last time; and position determination for determining, based on the calculated position that is updated or maintained in the calculated position update, a position, in the game space, of the object wherein in the position determination the position of the object is determined to be a position between the previous position of the object and the calculated position.

2. The storage medium according to claim 1, wherein the calculated position calculation is executed when the calculation data is received in the receiving;

the position determination is executed at intervals of the predetermined period of time;

in the position determination, a position of the object is determined based on a latest calculated position calculated in the calculated position calculation, and the position determined in the previously executed position determination.

3. The storage medium according to claim 1, wherein, in the calculated position calculation, a time lag, between time represented in the time data included in the calculation data received in the receiving and time in which the calculation data is received, is calculated, and the calculated position of the object as of when the calculation data is received is calculated based on the time lag.

4. The storage medium according to claim 1, wherein the calculation data further includes change of degree data representing a change of degree for the object with respect to positions as of when the object is at the position as represented by the position data included in the calculation data;

in the calculated position calculation, the calculated position of the object as of the point in time in the predetermined period of time is calculated based on the position data, the time data and the change of degree data included in the calculation data.

5. The storage medium according to claim 1, wherein the calculation data further includes operation data which represents a game operation executed as of when the object is at the position as indicated by the position data included in the calculation data; and in the calculated position calculation, the calculated position of the object as of the point in time in the predetermined period of time is calculated based on the position data, the time data and the operation data included in the calculation data.

6. The storage medium according to claim 1, wherein the calculation data further includes inclination data which represents an inclination of the object as of when the object is at the position as indicated by the position data, which is included in the calculation data; and the communication game program further causes the computer to execute inclination calculation for calculating, based on the inclination data included in the calculation data received in the receiving, the inclination of the object as of the point in time in the predetermined period of time.

7. The storage medium according to claim 1, wherein the communication game program, further causes the computer to execute starting a predetermined event simultaneously among each game device included in the game system; and the time data represents an elapsed time since when the predetermined event starts.

8. A communication game system in which a first game device and a second game device are connected to each other through a network, wherein the first game device comprises transmission programmed logic circuitry for transmitting to the second game device calculation data which includes, at least, position data representing a position, in a game space, of an object operated by the first game device, and time data representing time in which the object is at the position; the second game device comprises:

reception programmed logic circuitry for receiving the calculation data transmitted thereto from the first game device;

calculated position calculating programmed logic circuitry for calculating, based on the position data and the time data included in the calculation data received by the reception programmed logic circuitry, a calculated position of the object at a time in a predetermined period of time, the time in the predetermined period of time being determined in accordance with when the calculation data is received;

calculated position update programmed logic circuitry for, when the calculation data is received by the reception programmed logic circuitry, updating the calculated position based on the received calculation data, and for, when the calculation data is not received by the reception programmed logic circuitry, maintaining the calculated position calculated based on calculation data that is received by the reception programmed logic circuitry the last time; and position determining programmed logic circuitry for determining based on the calculated position that is updated or maintained by the calculated position update programmed logic circuitry, a position of the object in the game space, wherein, in the position determining programmed logic circuitry, the position of the object is determined to be a position between the previous position of the object and the calculated position.

* * * * *